(12) United States Patent
Brown

(10) Patent No.: US 7,626,297 B2
(45) Date of Patent: Dec. 1, 2009

(54) MASS MAGNIFIER USING MAGNETIC FIELDS AND MU-METAL TO PROVIDE AN ENERGY STORAGE FLYWHEEL FOR USE IN CONVENTIONAL, MICROTECHNOLOGY, AND NANOTECHNOLOGY ENGINES

(75) Inventor: Forrest J. Brown, Carson City, NV (US)

(73) Assignee: Bridgeway Research, Inc., Carson City, NV (US)

( * ) Notice: Subject to any disclaimer, the term of this patent is extended or adjusted under 35 U.S.C. 154(b) by 0 days.

(21) Appl. No.: 11/844,870

(22) Filed: Aug. 24, 2007

(65) Prior Publication Data

US 2009/0051235 A1    Feb. 26, 2009

(51) Int. Cl.
  *H02K 49/00*    (2006.01)
  *H02P 15/00*    (2006.01)
(52) U.S. Cl. .......................................... 310/103; 310/74
(58) Field of Classification Search .................. 310/103, 310/104, 106, 153, 85, 86, 74
  See application file for complete search history.

(56) References Cited

U.S. PATENT DOCUMENTS 4,882,509 A * 11/1989 Wottlin ........................ 310/46
7,279,816 B2 * 10/2007 Oikawa ........................ 310/36
2002/0135256 A1    9/2002 Nikolic
2003/0234590 A1   12/2003 Gitzen
2008/0075319 A1 *  3/2008 Kantor et al. ................ 381/420
2008/0224473 A1 *  9/2008 White .......................... 290/52

FOREIGN PATENT DOCUMENTS

JP    1-231671 A    9/1989
JP    2001-352725 A    12/2001

* cited by examiner

*Primary Examiner*—Hae Moon Hyeon
(74) *Attorney, Agent, or Firm*—Fliesler Meyer LLP

(57) ABSTRACT

A mass magnifier is created by combining the properties of permanent magnets or electromagnets with the property of mu-metal to create a novel energy storage device. In a system mu-metal is placed in the magnetic field created by a magnet or electromagnetic in a manner to provide an energy storage device, similar to a fly wheel. The system includes a set of magnets arranged in a circle around a cylinder in a stationary position, effectively forming a stator. Another set of opposing magnets are arranged to form a rotor. When the rotor is rotated, mu-metal material is inserted between the rotor and stator magnets in a manner so that the rotor will remain in motion in a desired rotation direction, even if an opposing force is applied to the rotor axle. The system, thus, forms an energy storage device similar to a fly wheel. The system can also provide energy storage for conventional machines or for smaller micro-technology or nano-technology type devices.

8 Claims, 4 Drawing Sheets

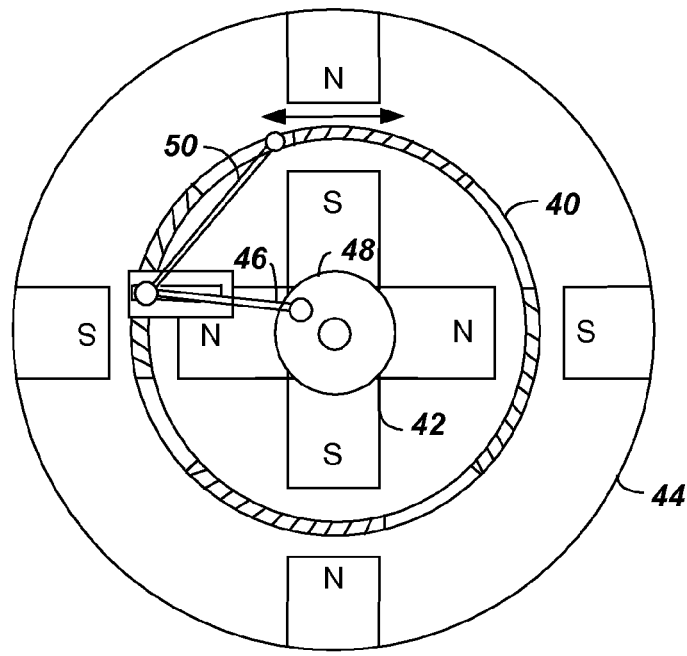
FIG. 6
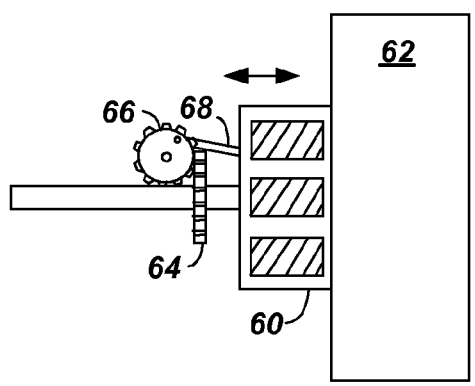 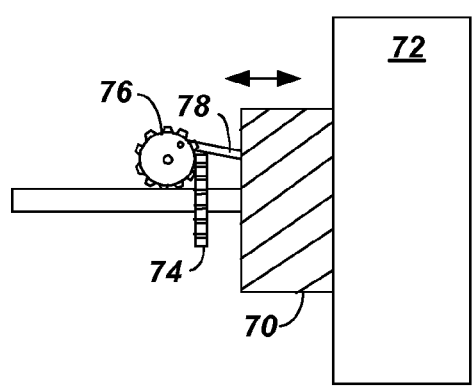
FIG. 7  FIG. 8

MASS MAGNIFIER USING MAGNETIC FIELDS AND MU-METAL TO PROVIDE AN ENERGY STORAGE FLYWHEEL FOR USE IN CONVENTIONAL, MICROTECHNOLOGY, AND NANOTECHNOLOGY ENGINES

BACKGROUND

1. Technical Field

The present invention relates energy storage devices using magnetic fields and a material, such as mu-metal, that can provide the property of screening or attenuating magnetic fields. More particularly, the present invention relates to components used in constructing an energy storage device, such as a fly wheel, using magnetic fields and mu-metal.

2. Related Art

Magnetic fields can be created by permanent magnets or electro magnets. The magnetic field generated can be used to create magnets to lift metal containers or scrap metal, to deflect charged particles as in a cathode ray tube, and to operate electric motors. Many uses for magnetic fields have been discovered, and it would be desirable to provide a means to enhance those uses or enable potentially untapped uses for magnetic fields.

Control of the electro magnetic field enables components such as magnetic lifting devices, charged particle deflectors, or electric motors to operate. For example, electric motors typically operate with a combination of permanent magnets arranged in a circle, and opposing electromagnets. Current is applied to the electromagnets in a manner to operate the device as an electric motor, or alternatively to use the device as a brake or charge generator. To provide an electric motor, current is applied to the electromagnets with appropriate timing so that the permanent magnets and electromagnets pull toward each other, and then push away from each other after passing to accelerate the motor in a desired direction. The electric motor can similarly be used for braking, such as regenerative braking used in hybrid electric-gasoline powered vehicles. To use the electric motor as a brake or generator, current is withdrawn from the electromagnets in a reverse direction of the current application to the electric motor so that the permanent magnets push away from each other and then pull toward each other after passing to decelerate the motor.

Mu-metal provides the property of high permeability making it very effective at screening static or low frequency magnetic fields, which cannot be attenuated by other methods. Its high permeability provides its "mu" name, with permeability being represented by $\mu$ the Greek letter mu. Mu-metal is a nickel-alloy, namely approximately 75% nickel and 15% iron plus a mixture of copper and molybdenum. The materials are annealed in a hydrogen atmosphere.

The annealing organizes the mu-metal's crystal structure so that its valence electrons are aligned in an arbitrary manner, unlike other magnetic materials. Permanent magnets have atoms with aligned valence electrons. In a soft metal such as iron the grains that do not normally have aligned valence electrons forming electromagnets, but current can be applied so that their valence electrons are aligned giving then a magnetic property. With mu-metal, the electrons will be arranged in a random manner so that no matter what the direction of a magnetic field applied to the mu-metal, its valence electrons will not align. This will cause a magnetic field striking the mu-metal to be significantly attenuated.

SUMMARY

Embodiments of the present invention recognized the advantage of combining the properties of permanent magnets or electric magnets with the property of mu-metal to create a novel energy storage device. In a system according to the present invention, mu-metal is placed in the magnetic field created by a magnet or electromagnetic in a manner to provide an energy storage device, similar to a fly wheel.

The system includes a set of magnets arranged in a circle forming a cylinder in a stationary position, effectively creating a stator. Another set of opposing magnets are rotatably arranged within the cylinder of stator magnets, effectively creating a rotor. When the rotor is rotated, mu-metal material is arranged so that it is inserted between the rotor and stator magnets when the poles of these magnets are aligned. In this manner, the push and pull forces provide by the magnets occur so that the rotor will remain in motion, even if an opposing force is applied to the rotor axle. The system, thus, forms an energy storage device similar to a fly wheel.

The system can be used in a number of different ways. In one embodiment, the system can be used as a fly wheel for a conventional engine. For example, the system can be used in a vehicle with an electric engine, such as in a hybrid car that includes both an electric engine and fossil fuel type engine. The mu-metal material can be combined with the electric motor components to create a fly wheel. The mu-metal can be removed to allow operation of the motor as an electric motor when an energy storing fly wheel is not desired. The fossil fuel engine flywheel can then be eliminated.

The system can also provide an energy storage device for micro-technology or nano-technology type components. One of the drawbacks currently in nano-technology components is the ability to supply more than minute quantities of energy at one time. With a system according to the present invention, the small bursts of energy can be stored and the energy level sustained over time until another burst is provided. This is similar to a fly wheel that keeps a fossil fuel engine running when the engine is running slowly or idling by sustaining movement of the crankshaft from one combustion burst until a subsequent burst to keep the engine running.

BRIEF DESCRIPTION OF THE DRAWINGS

Further details of the present invention are explained with the help of the attached drawings in which:

FIG. 6 is a cross sectional view of the back of a mass magnifier showing components that allow the mu-metal support ring to oscillate between a rotor and stator;

FIG. 7 is a side view of a mass magnifier showing how a cylinder supporting mu-metal material can be moved in and out from between a rotor and stator assembly to alternatively provide for operation as either an electric motor or a mass magnifier type fly wheel; and FIG. 8 is a side view of a mass magnifier illustrating operation with a cylinder made entirely of mu-metal that is moved in and out from between a rotor and stator assembly with appropriate timing to enable the device to function as an energy storage device.

DETAILED DESCRIPTION

Figure 1:
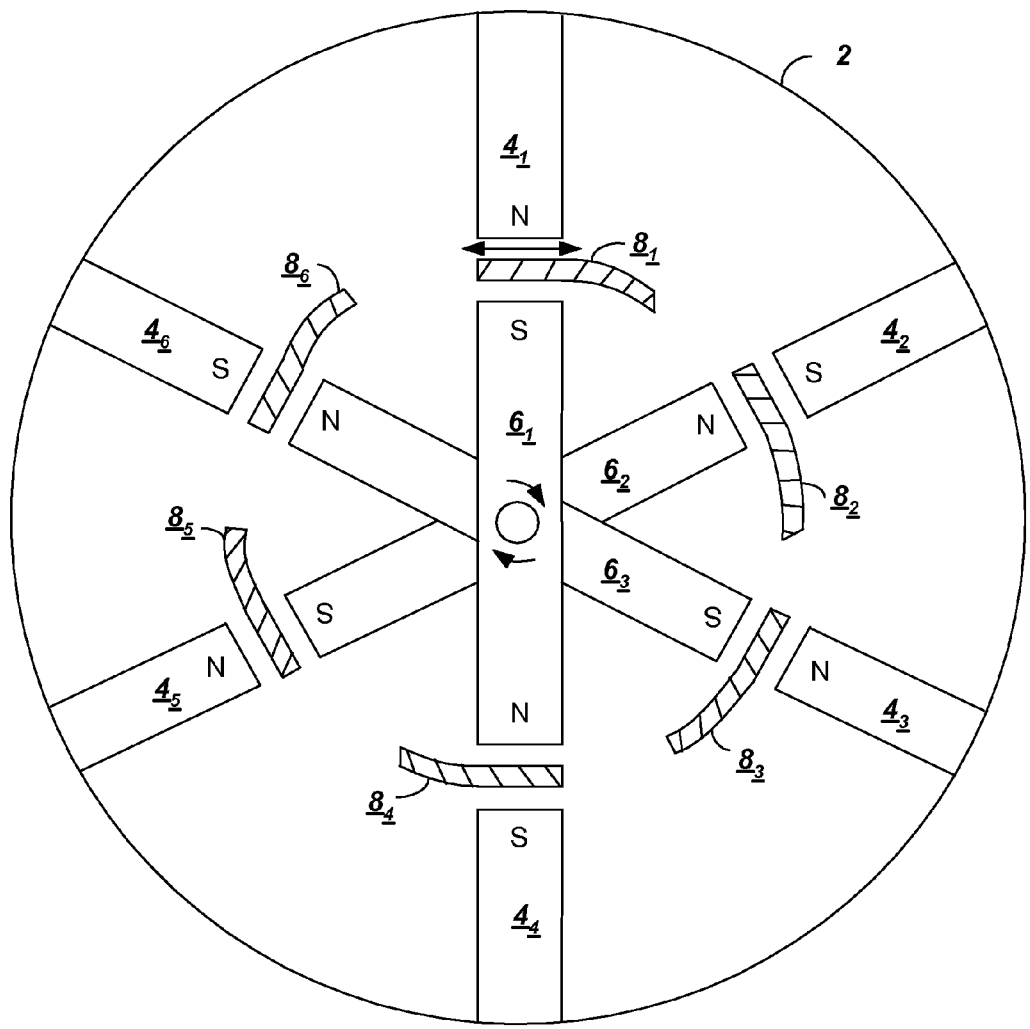
FIG. 1 shows a cross sectional view illustrating components of a mass magnifier according to one embodiment of the present invention.

FIG. 1 shows a cross sectional view illustrating components of a mass magnifier according to one embodiment of the present invention. The mass magnifier includes a cylinder or drum 2 with magnetic devices $4_{1-6}$ placed around the circumference of the cylinder 2. The magnetic devices $4_{1-6}$ can be permanent magnets or electromagnets, as can other components described as magnetic devices herein. The cylinder 2 and magnetic devices $4_{1-6}$ in the embodiment shown are assumed to be fixed in place to form a stator. Additional two pole magnets $6_{1-3}$ are rotatably connected together inside the cylinder 2 to form a rotor. Rotation of the rotor is illustrated by the arrows going in a clockwise direction, although rotation can likewise be counterclockwise. Although rotation of the center magnetic devices $4_{1-6}$ is illustrated, a further embodiment of the present invention allows for rotation of the cylinder 2 with magnets $4_{1-6}$, while magnets $6_{1-3}$ remain fixed.

Between the stator magnets $4_{1-6}$ and rotor magnets $6_{1-3}$ are strips of mu-metal $8_{1-6}$. The mu-metal material strips $8_{1-6}$ can be attached together to a ring or disk (not shown in FIG. 1) that is rotatably rocked in a back and forth in a manner relative to the magnets as illustrated by the arrows above mu-metal strip $8_1$. The rocking of the mu-metal strips $8_{1-6}$ is controlled in one embodiment to block magnetic fields when the stator magnets $4_{1-6}$ apply a force on the rotor magnets $6_{1-3}$ to prevent motion in the clockwise direction shown. Control further removes the mu-metal strips $8_{1-6}$ from between the stator magnets $4_{1-6}$ and rotor magnets $6_{1-3}$ when the magnetic field applies a force to move the rotor in the desired clockwise direction. More details of movement of the mu-metal strips $8_{1-6}$ is described with respect to FIGS. 5A-D subsequently.

Figure 2:
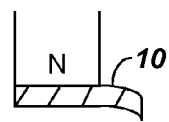
FIG. 2 illustrates how pure strips of mu-metal can be affected by the magnets.
Figure 2:

FIG. 2 illustrates how pure strips of mu-metal can be affected by the magnets. The mu-metal is made up of molecules with valence electrons that do not align in any particular direction. In contrast, a metal such as iron will have its valence electrons aligned between the magnets and will not attenuate the magnetic field significantly. The mu-metal will provide greater than a 90% attenuation of a magnetic field when placed between magnets relative to a conventional magnetic material.

The magnetic field between the two magnets will cause a thin piece of conventional magnetic material to bend and stick to one of the poles. The mu-metal, although having less tendency to bend and stick to one of the poles will still have some valence electrons that align and can bend and stick to one of the poles, as illustrated by mu-metal strip 10 attaching in FIG. 2.

In one embodiment of the present invention, to prevent the mu-metal from bending and sticking to the pole of one magnet as shown in FIG. 2, the metal is provided within a rigid material such as ceramic. The mu-metal can be cut into strips, or ground into a powder and impregnated into a ceramic material. The combined ceramic and mu-metal will offer substantially the same attenuation properties as a pure mu-metal strip, but will not bend to attach to either magnet pole.

In another embodiment the mu-metal material is made thick enough to resist bending, but this may be undesirable to a designer because the rotor and stator magnets will be more effective when placed closer together. Another alternative is to provide the mu-metal within a softer low dielectric material such as Teflon™ that is more flexible than ceramic yet has a low coefficient of friction so that it can contact the magnets of the rotor and stator and slide on the surfaces virtually unimpeded.

Figure 3:
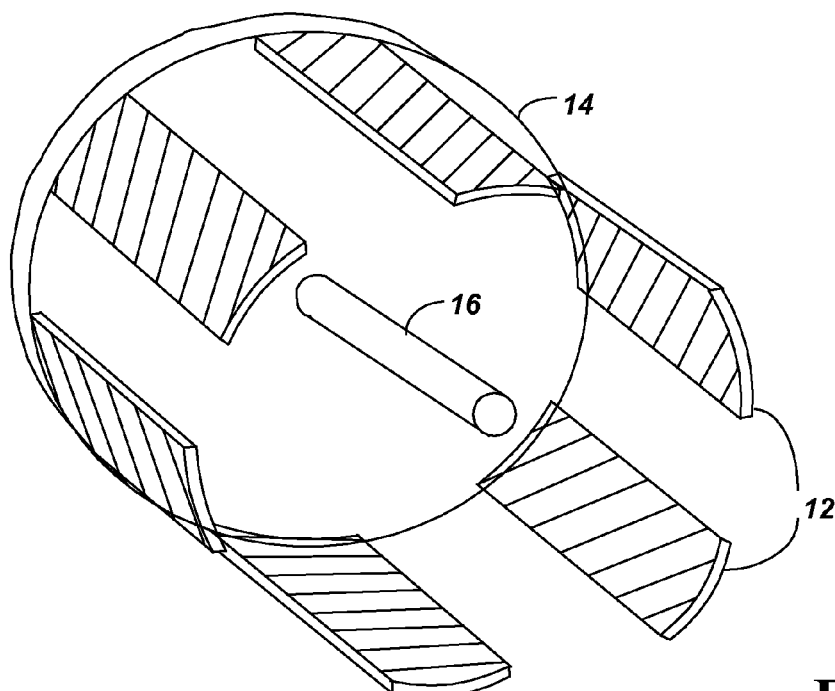
FIG. 3 is a perspective view illustrating how mu-metal can be formed in strips and connected to a disk to be rotatably mounted between a rotor and stator.

FIG. 3 is a perspective view illustrating how mu-metal can be formed in strips 12 and connected to a disk 14 (a ring can likewise be used instead of disk 14) to be rotatably mounted between a rotor and stator. The disk 14 provides a support for the mu-metal strips, and can be supported on a drive shaft 16 that is also the drive shaft for the rotor of the electric motor. The disk 14 is mounted behind the rotor and stator with the mu-metal strips 12 extending between the rotor and stator as shown in cross-section in FIG. 1. In the configuration of FIG. 3, the mu-metal strips 12 have unsupported ends opposite the disk 12 which can bend and stick to a magnet pole as illustrated in FIG. 2. Hence, it is beneficial in some embodiments to suspend the mu-metal within a ceramic to form the mu-metal strips 12.

Figure 4:
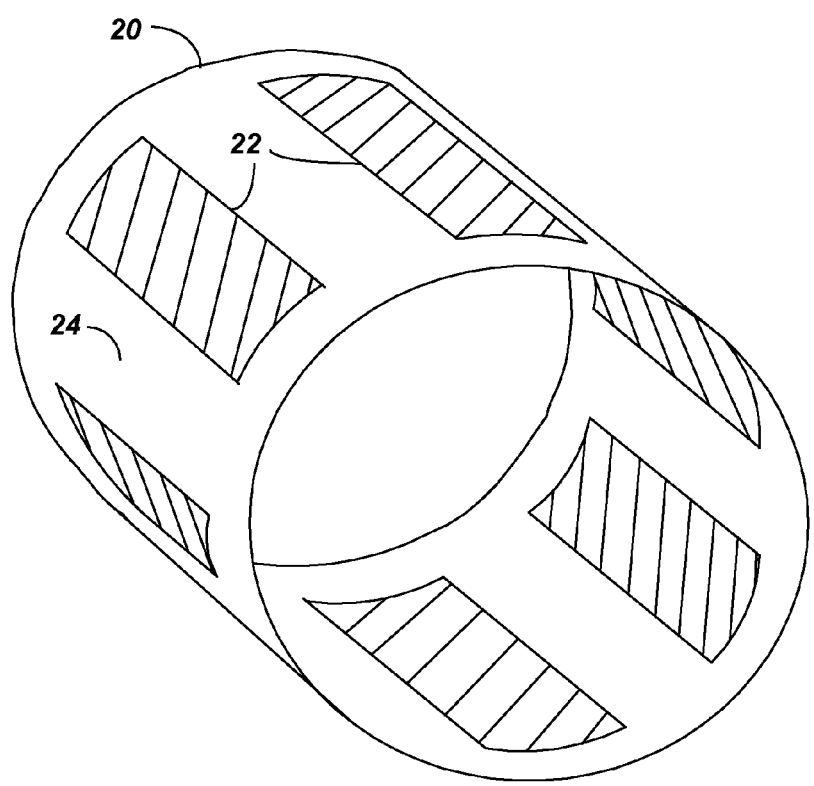
FIG. 4 is a perspective view illustrating another embodiment for mounting mu-metal strips on a cylinder that can be rotatably mounted between a rotor and a stator.

FIG. 4 is a perspective view illustrating another embodiment for mounting mu-metal strips 22 on a drum 20 that can be rotatably mounted between a rotor and a stator. The drum 20 can be formed from a dielectric material 24 that is readily permeated by magnetic fields. The mu-metal strips 22 can then be attached by an adhesive to the dielectric material 24. With a drum 20 supporting the mu-metal strips 22, the mu-metal will not have free ends that are as readily flexible as in the mounting configuration of FIG. 3 and can thus be manufactured as pure mu-metal rather than being suspended in a ceramic to provide added support.

FIGS. 5A-5D show cross sectional views of components of a mass magnifier illustrating a process for moving the mu-metal material between a rotor and stator to form an energy storage device. Reference will be made to movement of a rotor magnet 30 in a clockwise direction relative to stator magnets $32_{1-4}$, and how mu-metal strips $34_{1-4}$ are accordingly moved to provide an energy storage device. Reference is made only to movement of rotor magnet 30 for convenience since similar forces will be applied to the other rotor magnets.

Figure 5A:
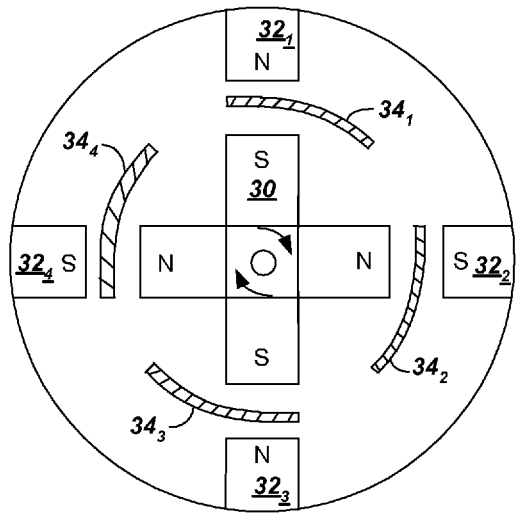
FIGS. 5A-5D show cross sectional views of components of a mass magnifier illustrating a process for moving the mu-metal material between a rotor and stator to form an energy storage device.

Beginning with FIG. 5A, the rotor magnet 30 is top dead center and opposed to stator magnet $32_1$. In this configuration the opposing "S" magnet pole 30 and "N" magnet pole $32_1$ attract, preventing movement of the rotor. Accordingly, the mu-metal strip $34_1$ is placed between the poles 30 and $32_1$ to attenuate the magnetic field and prevent the attractive force. The rotor is then free to move in a clockwise direction as shown by the arrows. For this example, it is assumed that an external force turns the crankshaft in a clockwise direction and the mu-metal strips $32_{1-4}$ are moved to cause the rotor to continue moving clockwise.

Figure 5B:
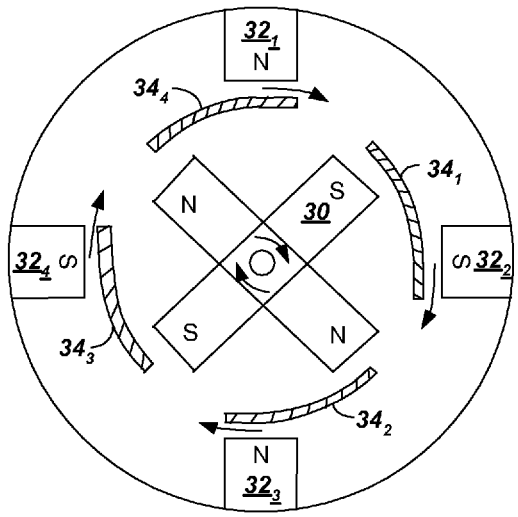

FIG. 5B illustrates that as the rotor continues to move clockwise, the mu-metal strip $34_1$ is moved with the pole 30 to break up any magnetic field between it and poles $32_1$ and $32_2$. Movement of the mu-metal $34_1$ is illustrated in this figure to follow the rotor pole 30. Without movement of mu-metal $34_1$, The "N" pole $32_1$ will provide an attractive force to pull the "S" pole 30 in a counter clockwise direction, which is undesirable. The "S" pole $32_2$ will further provide a pushing away force that will likewise turn the "S" pole 30 in a counterclockwise direction, which is undesirable. Accordingly, while rotor pole 30 is between stator poles $32_1$ and $32_2$ the mu-metal $34_1$ is moved clockwise as shown by the arrows to block or attenuate magnetic fields.

Figure 5C:
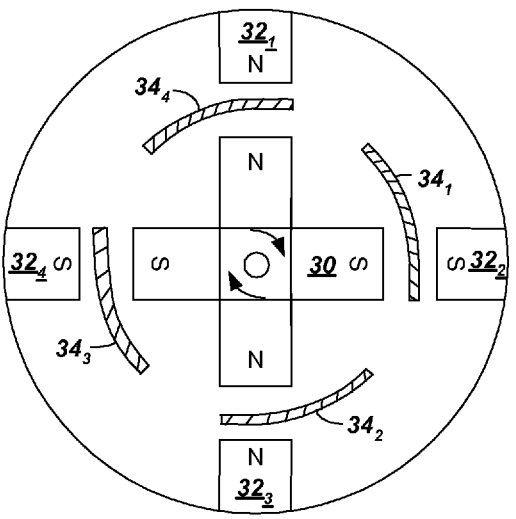

FIG. 5C illustrates further movement of the rotor magnet pole 30 between stator magnet poles $32_2$ and $32_4$. In this configuration the "S" magnet pole 30 and "S" magnet pole $32_1$ push away from each other, forcing rotation of the rotor in the desired clockwise direction. Accordingly, mu-metal strip $34_2$ is left in place so that it is not presented between poles 30 and $32_2$ as pole 30 moves clockwise away from stator pole $32_2$. The rotor is forced in a clockwise direction as shown by the arrows, and will offer resistance to a counterclockwise rotation.

Figure 5D:
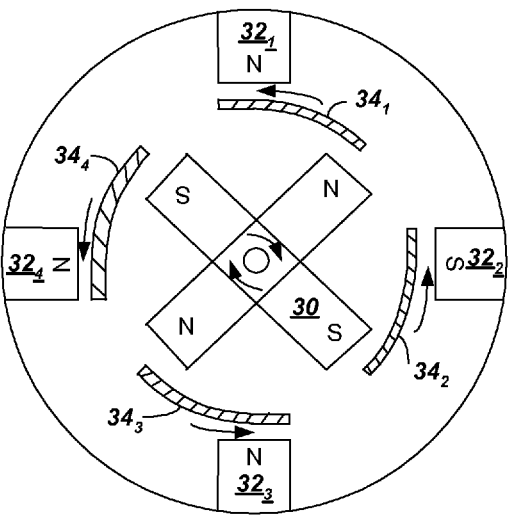

FIG. 5D illustrates movement of the mu-metal strip $34_2$ that occurs when the rotor pole 30 moves half way between poles $32_2$ and $32_3$ and continues to proceed toward pole $32_3$. The mu-metal strip $34_2$ is rotated counter clockwise, opposite the travel direction of the rotor. Both the mu-metal strip $34_2$ and $34_1$ are now back in the position they occupied in FIG. 5A. The mu-metal strip $34_2$ in this position will not block the magnetic field between the "S" rotor pole 30 and the "N" stator pole $32_3$ so they will attract and pull the rotor in a continued clockwise motion. Once the rotor pole 30 passes the stator pole $32_3$, the mu-metal strip $34_3$ will block its attenuation, and operation will continue as described with respect to FIG. 5A. In this manner the rotor pole 30 will continue to be forced by magnetic fields to continue to rotate in a clockwise direction, even against a counterclockwise force applied to the crankshaft to effectively create an energy storage device.

FIG. 6 is a cross sectional view of the back of a mass magnifier showing components that allow the mu-metal support ring 40 to oscillate between a rotor 42 and stator 44. The components include a first push rod 46 connected to a wheel 48 on the crankshaft of the rotor 42. A second push rod 50 connects the first push rod 46 to the mu-metal support ring 40. Connected as shown, rotation of the crankshaft of the rotor 42 will cause wheel 48 to turn, resulting in the first push rod 46 and second push rod 50 to cause the mu-metal support ring 40 to oscillate back and forth as illustrated by the arrows. Although not shown, a system of cams and spring operated rods can be used in place of wheel 48 push rods 46 and 50. Further, although not shown, an electronically controlled solenoid can be used to move the ring 40.

FIG. 7 is a side view of a mass magnifier showing how a cylinder 60 supporting mu-metal material can be moved in and out from between a rotor and stator assembly 62 to alternatively provide for operation as either an electric motor or a mass magnifier type fly wheel. The components for moving the cylinder 60 include two gears 64 and 62. The gear 62 is connected to the crankshaft of the combined rotor and stator assembly 62. The gear 66 is connected to a push rod 68 that is further attached to the cylinder 60. The gear 64 can be controlled so that when the crankshaft is turned the push rod 68 will move the cylinder linearly in or out of the combined rotor and stator assembly. The drive mechanism of FIG. 7 can be combined with the drive mechanism of FIG. 6, so that when the cylinder 60 is asserted into the rotor and stator assembly 62 the entire assembly behaves as a mass magnifier. Alternatively when the cylinder is removed, the rotor and stator assembly 62 can behave as an electric motor. Although shown as a system of gears and push rods, a similar cam system or electronic control system can be used.

A device connected as shown in FIG. 7 can in one example be provided in a hybrid car that includes both a fossil fuel and an electric engine. The electric engine can be operated to drive the car, or alternatively for regenerative breaking without the mu-metal inserted. With the mu-metal inserted, the electric engine will behave as a fly wheel, enabling elimination of the need for a fly wheel in the fossil fuel burning engine.

FIG. 8 is a side view of a mass magnifier illustrating operation with a cylinder 70 made entirely of mu-metal that is moved in and out in a linear fashion rather than requiring rotation from between a rotor and stator assembly 72 with appropriate timing to enable the device to function as an energy storage device. Unlike the mu-metal strips, such as illustrated in FIG. 3 or FIG. 4, here the entire cylinder 70 is made of mu-metal. Instead of oscillating like the mu-metal device illustrated in FIGS. 5A-5D, the entire cylinder 70 cannot rotate, as it will always block all magnetic fields. Accordingly, the cylinder 70 is inserted between the rotor and stator when magnetic field forces are exerted to move the rotor in an undesirable direction. The cylinder 70 is then removed when magnetic field forces are applied in the desired opposite desired direction. The mechanism for moving the cylinder 70 is shown to include gears 74 and 76 and push rod 78 that operated similar to the assembly described in FIG. 7, although a cam driven system or electronic control system can likewise be used.

The rotor and stator magnetic elements described with respect to previous figures operate to rotate. In some embodiments, however, the magnetic elements can slide linearly back and forth relative to each other. The mu-metal can be inserted between the magnetic devices in a similar fashion as to when the magnetic devices rotate to promote oscillation of the magnets linearly relative to each other.

The mass magnifier device described herein can be used with conventional sized rotor and stator devices. Alternatively the mass magnifier can be provided as a microtechnology or nanotechnology device. The microtechnology or nanotechnology device will reduce component sizes down to a microscopic level. With such a small device, the energy storage capabilities will significantly improve over the inertia provided by the heavier engine components used in a conventional sized device. In particular, with microtechnology and nanotechnology components one problem is that energy is provided in short bursts and cannot be sustained over time. The mass magnifier provides a fly wheel type effect allowing the short bursts of energy to be stored and maintained until another burst of energy can be provided. This fly wheel type effect is similar to a fly wheel used to assure a fossil fuel engine remains idling between combustion cycles that occur only periodically at idol speeds.

Although the present invention has been described above with particularity, this was merely to teach one of ordinary skill in the art how to make and use the invention. Many additional modifications will fall within the scope of the invention, as that scope is defined by the following claims.

What is claimed:

1. An apparatus comprising:
   a first magnetic device;
   a second magnetic device rotatably mounted relative to the first magnetic device; and
   mu-metal movably mounted between the first magnetic device and the second magnetic device to attenuate a magnetic field between the first and second magnetic devices during a portion of the rotation of the second magnetic device, wherein the mu-metal comprises a mu-metal material suspended in a ceramic.

2. An apparatus comprising:
   a first magnetic device;
   a second magnetic device rotatably mounted relative to the first magnetic device; and mu-metal movably mounted between the first magnetic device and the second magnetic device to attenuate a magnetic field between the first and second magnetic devices during a portion of the rotation of the second magnetic device, wherein the mu-metal comprises one of a series of metal strips mounted having a first end mounted on a rotatable ring and a second free end that can be inserted between the first magnetic device and the second magnetic device.

3. An apparatus comprising:

a first magnetic device;

a second magnetic device rotatably mounted relative to the first magnetic device; and mu-metal movably mounted between the first magnetic device and the second magnetic device to attenuate a magnetic field between the first and second magnetic devices during a portion of the rotation of the second magnetic device, wherein the mu-metal is provided on a rotatable cylinder formed from a low dielectric material.

4. The apparatus of claim 3, wherein the mu-metal is mounted to attenuate the magnetic field between the first and second magnetic devices when the magnetic field serves to prevent continued rotation of the second magnetic device.

5. The apparatus of claim 3, wherein the first and second magnetic devices comprise at least one of a permanent magnet or an electromagnet.

6. The apparatus of claim 3, wherein the first magnetic device, the second magnetic device and the mu-metal comprise at least one of micro-technology or nano-technology components.

7. An apparatus comprising:

a first magnetic device;

a second magnetic device rotatably mounted relative to the first magnetic device; and mu-metal movably mounted between the first magnetic device and the second magnetic device to attenuate a magnetic field between the first and second magnetic devices during a portion of the rotation of the second magnetic device, wherein the mu-metal is mounted to rotatably oscillate back and forth to selectively attenuate and not attenuate magnetic fields between the first magnetic device and the second magnetic device in a manner to enable continued rotation of the second magnetic device.

8. An apparatus comprising:

a first magnetic device;

a second magnetic device rotatably mounted relative to the first magnetic device; and mu-metal movably mounted between the first magnetic device and the second magnetic device to attenuate a magnetic field between the first and second magnetic devices during a portion of the rotation of the second magnetic device, wherein the mu-metal is mounted to be linearly inserted and removed from between the first magnetic device and the second magnetic devices to selectively attenuate and not attenuate magnetic fields between the first magnetic device and the second magnetic device in a manner to enable continued rotation of the second magnetic device.

\* \* \* \* \*